United States Patent [19]

Reeder

[11] 4,138,914

[45] Feb. 13, 1979

[54] SAW GUIDE APPARATUS

[76] Inventor: Donald G. Reeder, R.R. #2, Box 48, Galesburg, Ill. 61401

[21] Appl. No.: 859,763

[22] Filed: Dec. 12, 1977

[51] Int. Cl.$^2$ ............................................. B27B 9/04
[52] U.S. Cl. ..................................... 83/745; 83/486.1
[58] Field of Search ...................... 83/745, 743, 471.3, 83/486.1, 829; 33/115–120

[56] References Cited

U.S. PATENT DOCUMENTS

| 1,700,189 | 1/1929 | Wikstrom | 83/829 X |
| 2,625,184 | 1/1953 | Harbert | 83/486.1 X |
| 2,822,834 | 2/1958 | Hammers | 83/486.1 X |
| 2,959,199 | 11/1960 | Naumann | 83/486.1 X |
| 3,124,176 | 3/1964 | Vogini | 83/745 X |

Primary Examiner—J. M. Meister
Attorney, Agent, or Firm—Henderson, Sturm, Cepican & Fife

[57] ABSTRACT

An apparatus for a power hand saw. A guide spans the work to be cut, and the saw is positively attached thereto, the saw blade being adjacent the guide. An adjustable support extends to one side of the work, includes one member disposed against an edge of the work and pivotally attached to the guide, and includes a second member pivotally attached to the one member and slidably attached to the guide. The guide is unitary, having a turned-under section connected to the adjustable support.

6 Claims, 4 Drawing Figures

SAW GUIDE APPARATUS

BACKGROUND OF THE INVENTION

This invention relates to structures employable to guide a saw such that a cut of a desired angle can be made through a board or the like. The invention particularly relates to guide structures employed with portable power hand saws.

A large number of devices have been developed in this area. Generally such devices have employed a large number of parts disposed on or spanning, thereby cluttering, the work surface. The saw generally is pressed against the side of the guide member of such devices or is equipped with a channel which drapes over and slides upon the guide member, the saw in neither case being positively attached to the guide such that a sure cut is facilitated. A device of relatively simple, and economical, construction solving the aforementioned problems is desirable.

SUMMARY OF THE INVENTION

An apparatus for a power hand saw includes a guide structure and an adjustable support structure. The guide structure is unitary, having a longer portion and shorter portion, the latter contiguous with, and curved beneath, the former. The support structure includes first and second members pivotally attached. The first member is pivotally attached, and the second member slidably attached, to the shorter guide structure portion. The power hand saw is positively attached to, and slidable along the length of, the longer guide structure portion. The first member is pressed against an edge of the work, and the longer portion spans the work, the power saw sliding along the guide while the work is cut.

It is an object of this invention to provide an attachment for a hand saw which effectively guides the hand saw while leaving the surface of the work uncluttered.

It is also an object of this invention to provide a guide for a hand saw which is positively attached to the hand saw thereby providing for greater safety and accuracy of operation of the saw.

Still another object of this invention is to provide an attachment for a hand saw which is simple and economical of construction yet capable of guiding the saw effectively and achieving the aforementioned objects.

These objects and other features and advantages of this invention of a saw guide apparatus will become readily apparent upon referring to the following description, when taken in conjunction with the appended drawing.

BRIEF DESCRIPTION OF THE DRAWING

This invention of a saw guide apparatus is illustrated in the drawing wherein.

DESCRIPTION OF THE PREFERRED EMBODIMENT

Figure 1:
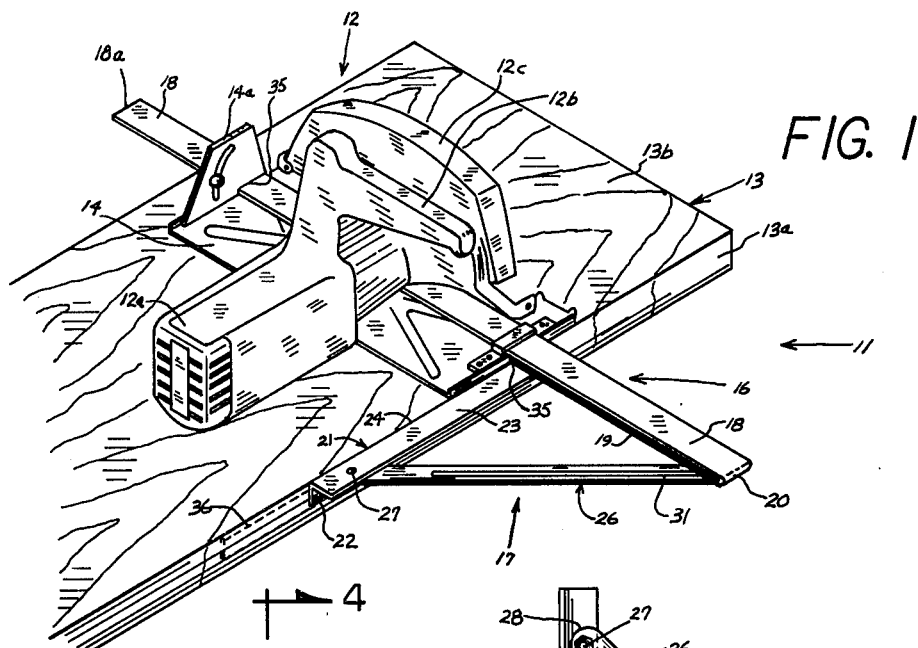
FIG. 1 is a perspective view showing the invention employed with a power hand saw in the operation of cutting a work piece.

The saw guide apparatus is shown generally at 11 in FIG. 1 employed with a power hand saw 12 for cutting a board or the like 13. The saw 12 illustrated is a rotary blade saw made by Black & Decker Co., but other brands of saws may be employed with the invention 11. The saw 12 includes a housing 12a enclosing the motor, a handle 12b integral with the housing 12a, a shield 12c joined to the housing 12a and partially enclosing the saw blade, and a template or base 14. A standard angle adjustment structure 14a (partially shown in FIG. 1) is employed for holding the blade of the saw 12 at a particular angle with respect to the template 14. The saw guide apparatus 11 more particularly includes a guide structure 16 and an adjustable support 17.

Figure 2:
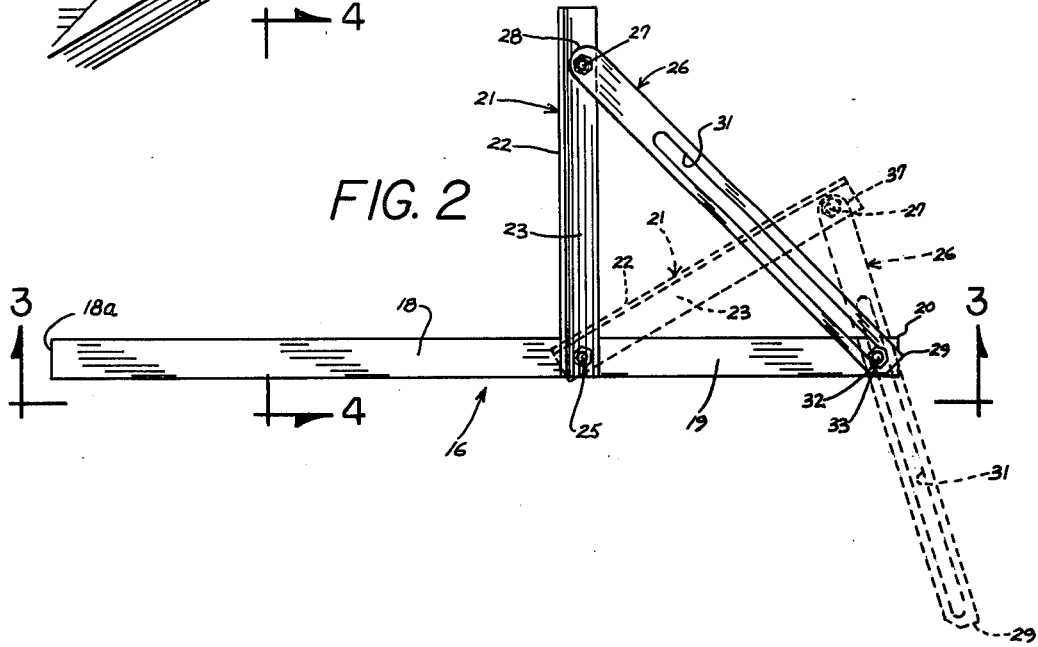
FIG. 2 is a bottom plan view of the saw guide apparatus.
Figure 3:
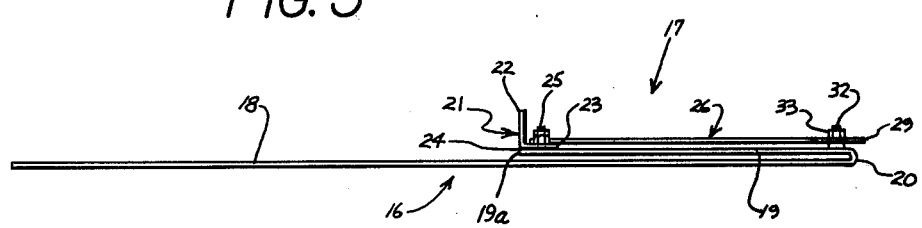
FIG. 3 is a side elevational view taken along line 3—3 of FIG. 2, the saw guide apparatus being upside down.
Figure 4:
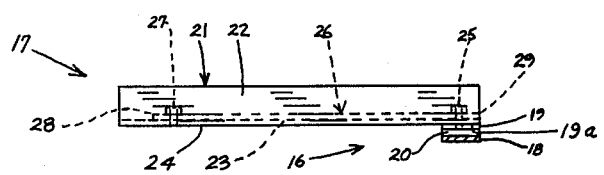
FIG. 4 is a sectional view taken along line 4—4 of FIG. 2, the saw guide apparatus being upside down.

The guide structure 16, best illustrated in FIGS. 2 and 3, is unitary, having a first, longer portion 18 and a second, shorter portion 19. The portions 18, 19 have ends 18a, 19a and are contiguous, being joined at 20. The shorter portion 19 is turned directly under, spaced apart from, and disposed parallel with, the longer portion 18. Both portions 18, 19 have a uniformly flat, rectangular cross section (FIG. 4).

The adjustable support 17 includes a first, angle member 21 and a second, arm member 26. The angle member 21 (FIGS. 2 and 4) includes elongated, flat abutment and mounting portions 22, 23. These portions 22, 23 are joined at a common longitudinal edge 24 and are perpendicular to each other. The second portion 19, adjacent end 19a, is pivotally attached to mounting portion 23 at a point 25 adjacent one end of the portion 23. The arm member 26 is pivotally attached to, at a point 27 adjacent the opposite end of, mounting portion 23. The second portion 19 pivots over the top surface, and the arm member 26 over the bottom surface, of mounting portion 23.

The arm member 26 (FIGS. 2 and 4) is generally flat and elongated. The member 26 has a beveled end portion 28 adjacent the pivot attachment 27 and an opposite end 29. A slot 31 is formed in the member 26 and extends along the longitudinal axis of the member 26 from a point adjacent the end 29 to a point approximately three-fourths of the way toward end 28. A bolt member 32 is attached to, and depends from, second portion 19 adjacent jointure 20. The bolt 32 fits into, and is slidable along the length of, the slot 31. An adjustable locking nut 33 is threaded onto the end of the bolt 32 projecting through the slot 31.

A loop bracket 34 is attached to the template or base 14, and slots or notches are cut in the base 14 as at 35 (FIG. 1). The first portion 18 is slidably received through the bracket 34 and slots or notches 35 and is held thereby against the top surface of the base 14. The first portion 18 is disposed such that the longitudinal edges thereof are parallel to the plane of the saw blade. The template or base 14 is slidably receivable within the space between the first and second portions 18, 19.

The angle member 21 can be modified by extending the abutment portion 22 beyond the end of the mounting portion 23 adjacent pivot attachment 27, thereby forming a thumb or hand engageable portion 36 (FIG. 1). Also, the beveled end 28 can be completely arcuate, as shown in dotted lines at 37 in FIG. 2. Whether brackets 34, slots or notches 35, or a combination of both are employed is determined by the configuration of the saw template.

The parts of the saw guide apparatus 11 are comprised of a metal, an iron or steel, and are formed by cutting, bending and other forming methods well known in the art of working such materials.

When a board or the like 13 is to be cut at a particular angle, the saw guide apparatus 11 is appropriately adjusted. The abutment portion 22 is disposed against a side surface 13a of the board 13 such that the top surface of the mounting portion 23 is flush with the board surface 13b across which the cut is to be made. The first portion 18 of the guide structure 16 will be disposed across the surface 13b. The locking member 33 is threaded away from the arm member 26, and the arm 26 is then moved with respect to the second portion 19, the bolt 32 traveling within slot 31. The guide structure 16 and the arm 26 pivot about points 25, 27 respectively until the longitudinal axis of portion 19 is parallel to the desired direction of cut across surface 13b. The locking member 33 is then tightened on bolt 32 thereby locking arm 26 against portion 19 and the guide structure 16 in a fixed angle with respect to the support 17. The disposition of the portion 18 across the surface 13b aids in obtaining the final, fixed angle, either by facilitating estimation by eye of a rough cutting angle in situations where a great degree of accuracy is not required or by ready alignment with a line drawn across surface 13b where greater accuracy is required. The movement of structures 16, 17 is illustrated in FIG. 2, solid lines indicating adjustment for a cut of 90° with respect to the edge 13a of the surface 13b and dotted lines indicating adjustment for such a cut of 30° (60° miter).

The first portion 18 of the guide structure 16 is passed through the brackets and slots 34, 35 of the base 14. The saw 12 is then slid along the portion 18 until the base 14 is disposed in the space between the first and second portions 18, 19. The abutment portion 22 is disposed against the side 13a such that the top surface of portion 23 is flush with surface 13b. The saw motor is started, and the saw 12 is pushed across the surface 13b. The saw 12 follows portion 18 of the guide 16, and a cut of the correct angle is thereby made. The cutting operation is illustrated in FIG. 1.

The saw 12 may be disposed on the guide 16, such that the base 14 is between portions 18, 19, prior to adjusting the angle of structures 16, 17. Adjustment should not be done while the saw motor is actuated. Furthermore, the saw employed should be one having adequate shielding of all parts of the blade.

It may be noted from the foregoing that the surface 13b is kept relatively clear and uncluttered such that the work 13 and the progress of the cut thereon may be more readily monitored. Also, the saw 12 is positively attached to, and therefore must follow, the guide portion 18. Greater accuracy is achieved than in the case of devices where the saw may be inadvertently moved away from pressing against the side of a guide or where a sliding channel member of a saw may become untracked. Furthermore, the pressure which disposes the angle member 21 against the side 13a, and the pressure which moves the saw 12 along guide portion 18, are applied in the same direction, the workman being required to employ one hand only which grasps the handle 12b. Prior devices generally have required that one hand of the worker grasp the device and pull toward the worker to secure the device to the work and the other hand grasp and push the saw away from the worker. The invention 11 is safer because only one hand need be employed and, even where a second hand is applied against angle member 21, the saw 12 is never being moved toward any part of the workman's body during cutting. The construction of the guide structure 16 permits the base 14 to be cradled and the saw 12 supported in a position of disengagement from the work 13 thereby enabling the workman to make several cuts of the same angle rapidly.

Although a preferred embodiment and modifications thereof of the apparatus for a power hand saw have been disclosed herein, it is to be remembered that various modifications and alternate constructions can be made thereto without departing from the full scope of the invention, as defined in the appended claims.

I claim:

1. Guide apparatus for use with a hand saw employed in cutting workpieces, said guide apparatus comprising:
   unitary means for guiding the hand saw including first and second contiguous guide portions, said first guide portion being longer than said second guide portion, said guide portions from the jointure thereof having terminal ends extended in the same direction, said guide portions forming a space therebetween, the hand saw being slidable along said first guide portion and slidably receivable within said space; and
   adjustable means for supporting said unitary means, said adjustable means including an angle member and an arm member, said second guide portion adjacent said terminal end thereof being pivotally mounted upon said angle member, said arm member at one end thereof being pivotally affixed to said angle member and extending therefrom toward said second guide portion, said second guide portion slidably receiving said arm member adjacent said guide portions' jointure, said angle member being removably disposable against the side of a workpiece, said first guide portion being disposable across the surface of the workpiece to be cut.

2. A guide apparatus as defined in claim 1 and further wherein said adjustable means includes abutment and mounting portions, said abutment portion depending from said mounting portion, said second guide portion and said arm member being attached to, adjacent opposite ends of, said mounting portion, said second guide portion, said arm member and said mounting portion being disposed away from the workpiece when said abutment portion is disposed against the workpiece.

3. A guide apparatus as defined in claim 2 and further wherein said arm member has an elongated slot formed therethrough, said second guide portion having a bolt means depending therefrom adjacent said guide portions' jointure, said bolt means slidably engaging said slot, said bolt means being operable to selectively lock said arm member against said second guide portion.

4. A guide apparatus as defined in claim 2 and further wherein said abutment portion includes a hand-engageable extension member.

5. A guide apparatus as defined in claim 1 and further wherein said unitary means has a uniform cross-section, said first and second guide portions being disposed in parallel.

6. A guide apparatus as defined in claim 1 and further wherein the hand saw includes a template, the template having securement means attached thereto, said first guide portion being slidably receivable by said securement means, the template being slidably receivable within said space.

* * * * *